Sept. 29, 1964   R. J. CAROLAN   3,150,683
DIAPHRAGM OPERATED PRESSURE RETAINING VALVE
Filed May 31, 1963   2 Sheets-Sheet 1

INVENTOR.
Raymond J. Carolan
BY
Hovey, Schmidt, Johnson & Hovey
ATTORNEYS.

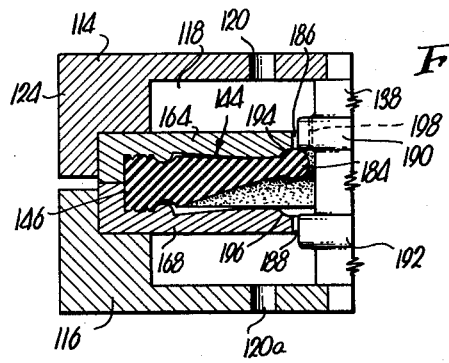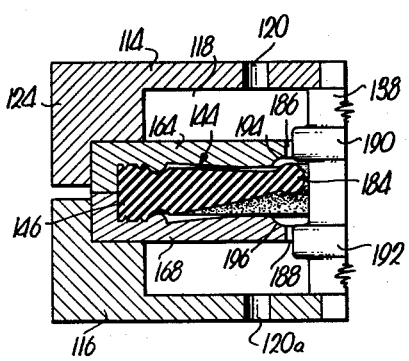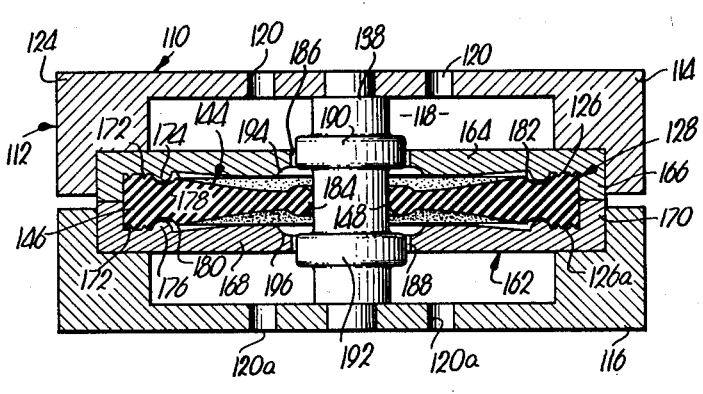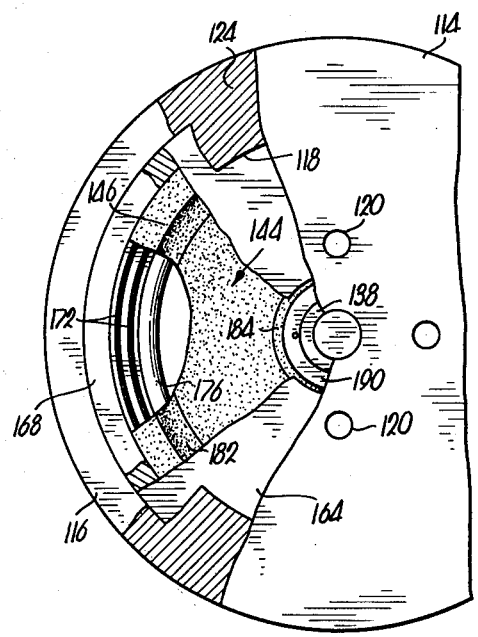

UNITED STATES PATENT OFFICE 3,150,683
Patented Sept. 29, 1964

3,150,683
DIAPHRAGM OPERATED PRESSURE
RETAINING VALVE
Raymond J. Carolan, Prairie Village, Kans., assignor, by mesne assignments, to Puritan Compressed Gas Corporation, Kansas City, Mo., a corporation of Missouri
Filed May 31, 1963, Ser. No. 284,595
7 Claims. (Cl. 137—493)

This invention relates to valves, and more particularly to valves for retaining fluid in a closed container when the pressure of such fluid falls to a predetermined value.

Many types of commercial gases such as nitrogen, oxygen, nitrous oxide, and others, are supplied to the customer in a reusable cylinder adapted to receive a relatively large volume of the gas under high pressure. A valve on the outlet of the cylinder permits selective, controlled release of gas from the container. If the cylinder is permitted to become completely exhausted of the original gas before refilling, air from the atmosphere will contaminate the interior of the cylinder requiring expulsion of the air before a new charge of gas can be introduced into the container. This air expulsion procedure necessarily increases the cost of operation of the gas supplier.

The invention has for its primary object the provision of a valve especially adapted to be mounted on a gas cylinder and which will accommodate a wide range of quantities of flow in either direction to permit the rapid introduction and normal withdrawal of fluid from the container, yet is operable to preclude further fluid flow from the container at a certain predetermined pressure value to prevent complete evacuation and resulting contamination of the interior of the container with air from the atmosphere.

Another important object of the present invention is the provision of a valve which does not have a tendency to stick in a closed position but remains operative even when permitted to remain inactive over long periods of time.

A further object of the invention is to provide a valve which will retain its characteristic of operating at a particular pressure over a long period of use.

Yet another object of the instant invention is the provision of a valve of symmetrical design to insure equally good operability in either direction of flow of fluid therethrough.

A further object of the present invention is to provide a valve wherein the fluid flow regulating characteristics thereof may be chosen by simply employing a flexible flow control member of required hardness.

Other objects and advantages of the instant invention will become apparent from the description, drawing and appended claims.

In the drawings:

FIG. 4 is a plan view of a modified form of apparatus embodying the principles of the invention, parts being broken away and in cross section to reveal details of construction;

FIG. 5 is a vertical, cross-sectional view of the apparatus of FIG. 4;

FIG. 6 is a fragmentary, vertical, cross-sectional view of the apparatus of FIG. 5 showing the valve member in one condition of deformation; and FIG. 7 is a view similar to FIG. 6 showing the valve member in its extreme deformed condition.

Figure 2:
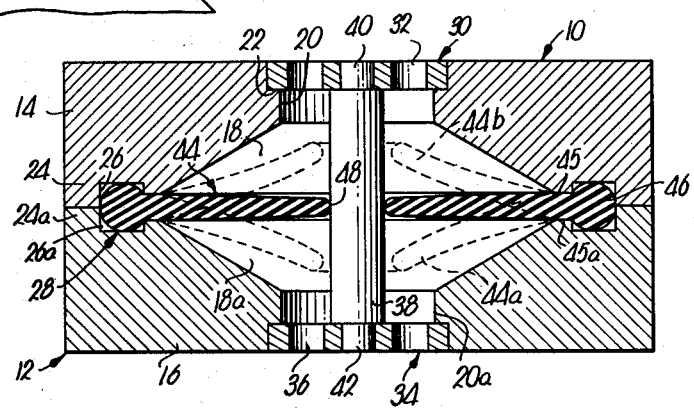
FIG. 2 is a vertical, cross-sectional view of one form of the invention with deflected positions of the valve member shown in dashed lines.
Figure 3:
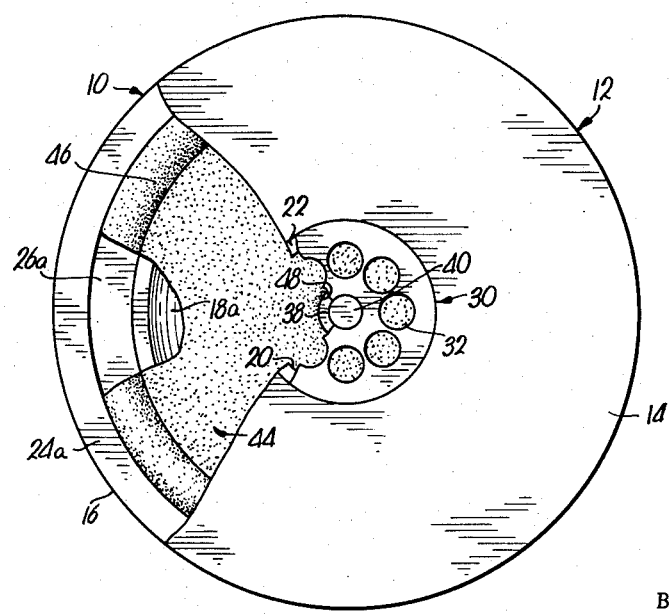
FIG. 3 is a plan view of the apparatus of FIG. 2, parts being broken away to reveal details of construction.

Referring initially to FIG. 2, the flow control apparatus embodying the principles of this invention is broadly designated 10, and includes a housing 12 comprising an upper section 14 and a lower section 16. The upper section 14 is of generally cylindrical configuration and is provided with an internal cone-shaped cavity 18. A port 20 communicates with cavity 18 to present a shoulder 22 as shown in FIG. 2. A depending flange 24 extends peripherally around section 14 to form one side of a groove 26 likewise extending around section 14 for a purpose to be hereinafter described.

Lower section 16 is identical to upper section 14, and it will be noted in FIG. 2 that section 16 is inverted and disposed with its upwardly extending flange 24a abutting flange 24 of section 14. Groove 26a is aligned with groove 26 to form a channel 28 around cavity 18 of section 14 and the corresponding cavity 18a of section 16. The aligned cavities 18 and 18a provide a fluid passage through housing 12. A disc-shaped retainer element 30 having apertures 32 therethrough is received in port 20 of section 14 with the lower surface thereof abutting shoulder 22 and a similar retainer element 34 having apertures 36 therethrough is received in the corresponding port 20a of section 16. A cylindrical element in the form of a rod 38 is disposed axially of housing 12 and is maintained in position by means of retainer elements 30 and 34 which receive ends 40 and 42 of rod 38 as shown in FIG. 2.

A generally flat valve member 44 of flexible material has an outer rim 46 of enlarged, cross-sectional configuration which is received in channel 28 to secure member 44 in disposition extending transversely across housing 12. Opposed, annular abutments 45 and 45a on sections 14 and 16 respectively, present therebetween an annular restriction which receives member 44 to securely clamp the latter and thereby provides an effective fluid seal between valve member 44 and housing 12. A centrally disposed, circular opening 48 in member 44 receives therethrough the rod 38 with the edge of member 44 which defines opening 48 normally engaging the outer peripheral surface of rod 38 when member 44 is in its normal fluid-blocking position as shown by closed lines in FIG. 2.

Figure 1:
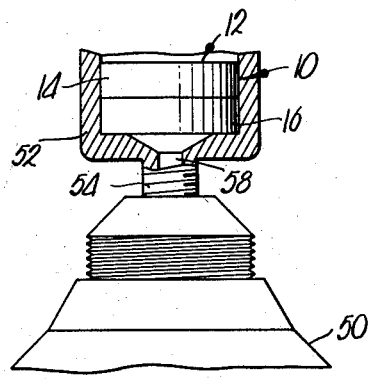
FIGURE 1 is a fragmentary, vertical, cross-sectional view on a reduced scale of a typical installation of the flow control apparatus in a fluid container.

One typical installation of apparatus 10 is represented in FIG. 1 wherein is shown the upper portion of a compressed fluid-storing structure in the form of a container 50 having a neck 54 threaded into an opening (not shown) in the upper end of container 50. An opening 58 places the interior of housing 52 in fluid communication with container 50.

When container 50 is filled with compressed fluid, the pressure of the fluid entering through apertures 32 acts upon valve member 44 to stretch the latter into the location illustrated in dotted lines and denominated 44a in FIG. 2. The deforming of member 44 by the stretching thereof breaks the fluid seal between member 44 and rod 38 to permit the passage of the fluid through opening 48 which then enters chamber 60. It should be noted that the force of the pressure on member 44 causes an iris-like expansion of opening 48 to accommodate the flow of fluid.

The pressure of fluid on either side of member 44 will, of course, equalize when the main shutoff valve (not shown) is closed. This permits member 44 to return to its initial position as shown in FIG. 2. When fluid is withdrawn from container 50, the opening of the shutoff valve causes a pressure differential to exist on member 44 to permit the latter to be flexed into the dotted line position designated 44b in FIG. 2. It will be noted that opening 48 is enlarged when member 44 is in this position in a manner similar to that previously described when member 44 was in the position shown designated as 44a. When member 44 is in position 44b, fluid may flow out port 20.

When the contents of container 50 have been exhausted to a point where the fluid in chamber 60 has a predetermined pressure, the pressure differential caused by the opening of the shutoff valve will not be great enough to flex member 44 and the fluid-tight seal between member 44 and rod 38 will be maintained to insure that a quantity of fluid will be kept in container 50 so that chamber 60 will not become contaminated from the introduction of foreign fluid such as air therein. Obviously, the value of the pressure differential necessary to cause the flexing of member 44 and thereby the breaking of the fluid-tight seal across housing 12, can be governed by selecting the material from which the valve members 44 are fabricated.

Referring now to FIGS. 4–7 wherein a modified form of apparatus broadly designated 110 is shown, a housing 112 includes a circular, generally cup-shaped, upper section 114 having a peripherally extending, depending flange 124 and a plurality of fluid passage ports 120 communicating with a cavity 118 therein.

A bottom section 116 is identical to upper section 114 and is inverted as shown in FIG. 5. A backing member assembly 162 comprising an upper disc member 164, having a peripheral, downwardly extending flange 166 and a lower disc member 168 similar to member 164 but having an upwardly extending peripheral flange 170 abutting flange 166, is clamped between sections 114 and 116 as clearly shown in FIG. 5. The disc members 164 and 168 are configured to present therebetween a peripherally extending channel broadly designated 128 which includes a downwardly-facing groove 126 in member 164 and an upwardly-facing groove 126a in member 168.

An outer peripheral rim 146 of a flexible valve member 144 is received within channel 128 and is clamped therein in fluid-sealing relationship between members 164 and 168. In this respect, it will be noted from FIGS. 5, 6 and 7 that rim 146 is generally configured to conform in shape with the configuration of channel 128, and spaced, integral, annular embossments 172 on members 164 and 168 in channel 128, grip rim 146 of member 144 to firmly hold the latter. Integral, annular ridges 174 and 176 on members 164 and 168, respectively, provide a neck of reduced dimension for channel 128, and the outer, arcuate surfaces 178 and 180 of ridges 174 and 176 respectively, accommodate arcuate grooves 182 on either side of member 144 as the latter flexes in a manner to be more fully described. It will be noted that member 144 tapers inwardly as the center thereof is approached with member 144 terminating in an enlarged lip in the nature of an integral, annular bead 184.

A generally cylindrical rod 138 extends through an opening 148 defined by bead 184 and is positioned to extend axially of housing 112 by having opposed ends thereof secured in respective sections 114 and 116, as shown in FIG. 5. Rod 138 extends through centrally disposed holes 186 and 188 in respective disc members 164 and 168. It will be noted that hole 186 is considerably larger than rod 138 and accommodates an annular enlargement 190 integral with rod 138 and disposed to partially close hole 186 with the outer peripheral surface of enlargement 190 spaced inwardly from disc member 164 as shown. Similarly, an annular enlargement 192 integral with rod 138 is positioned in hole 188 with the outer peripheral surface of enlargement 192 spaced from disc member 168. Thus, there is presented an annular orifice between hole 186 and enlargement 190 and a like annular orifice between hole 188 and enlargement 192.

The inner surfaces of disc members 164 and 168 are tapered to present increased cross-sectional areas as respective holes 186 and 188 are approached with the inner surfaces terminating in an annular, arcuate shoulder 194 proximal hole 186, and a similar shoulder 196 proximal hole 188. A plurality of ports 120a communicate with the interior of casing 112 through lower section 116 in the same way that ports 120 communicate through upper section 114.

It is contemplated that apparatus 110 will be utilized in much the same manner as appraratus 10 in that apparatus 110 will be installed in structure to provide flow control for a container for fluid. Valve member 144 is normally in the position shown in FIG. 5 with bead 184 providing a fluid-tight seal between member 144 and the outer surface of rod 138. However, when fluid enters housing 112 through port 120, the pressure of the fluid acting upon the upper surface of member 144 causes the latter to stretch. This enlarges the opening 148 defined by bead 184 to break the seal between member 144 and rod 138 and permit the flow of fluid through the passage in housing 112 and past member 144. The fluid then flows through the orifice between hole 188 and enlargement 192 to proceed through ports 120a and into the fluid container (not shown). It will be noted that the particular configuration of member 144 permits the flexing of the latter downwardly about a pivot formed by ridge 176 and the arcuate configuration of the latter with the arcuate surface 178 prevents a smooth joint to avoid damage to member 144.

When the pressure on opposite sides of member 144 is equalized, member 144 returns to its fluid-sealing position. Thereafter, when fluid is withdrawn past member 144, the latter will be flexed to permit passage between bead 184 and rod 138 as will be readily understood. It is to be noted, however, that the particular configuration of apparatus 110 will permit flexing of member 144 only to the extent defined by the rigid backing member assembly 162.

Accordingly, when bead 184 of member 144 reaches an extreme position thereof shown in FIG. 7, the orifice between hole 186 and enlargement 190 is sealed by bead 184 to prevent further fluid flow therethrough. This serves to insure that only a predetermined maximum rate of flow will be permitted past the apparatus 110, and when the pressure differential on opposite sides of member 144 reaches a point which would cause a flow greater than that desired, the flow is automatically shut off. It will be noted in FIG. 7 that there is provided an axially extending conduit 198 shown in dashed lines extending transversely of enlargement 190 to permit the passage of a small amount of fluid past enlargement 190 even when bead 184 is in the blocking position illustrated.

Conduit 198 may serve to permit a small amount of fluid to flow through apparatus 110 even though the pressure differential is great enough to move bead 184 into its sealing position. Further, conduit 198 may serve to equalize the pressure on either side of member 144 after an outlet shutoff valve (not shown) is closed to permit member 144 to return to its normal, fluid-blocking position with bead 184 engaging the outer surface of rod 138. This prevents member 144 from being tightly held into its blocking position across the orifice between hole 186 and enlargement 190 to prevent member 144 from taking a permanent "set" as a result of being held against the rigid disc 164 and enlargement 190 under the high pressures which may be involved. It will be noted that the arcuate shoulder 194 cooperates with the arcuate outer surface of bead 184 to present a smooth surface against which bead 184 works to effect the fluid seal, thereby increasing the efficiency of the seal and adding to the wear life of the flexible member 144.

It is apparent from the drawings that apparatus 110 will operate in a like manner to shut off the flow of fluid when the pressure differential reaches a sufficient value in the opposite direction to flex member 144 into sealing position against the orifice formed by hole 188 and enlargement 192. The rounded shoulder 196 receives bead 184 in much the same manner as previously explained with respect to shoulder 194.

The flow governing characteristics of apparatus 110 may be selected by choosing the material for member 144, it being understood that the stronger the material of member 144, the greater will be the pressure differential that will be required to flex member 144 and to break the fluid seal between bead 184 and rod 138.

Having thus described the invention, what is claimed as new and desired to be secured by Letters Patent is:

1. Control apparatus for retaining a fluid at a selected pressure in fluid-receiving structure, said apparatus comprising:
   a housing adapted to be secured to said structure and having a fluid passage therethrough communicating with the structure;
   a flexible member carried by the housing in normal fluid blocking relationship to the passage; and
   an elongated element in the passage, the member having an opening therethrough receiving the element, the edge of the member defining the opening normally in fluid-sealing disposition around the outer surface of the element, said member being stretchable under fluid pressure to shift said edge into a deflected location to permit flow of fluid through the passage when the difference in fluid pressure on opposite sides of the member exceeds said selected pressure; and a circumferentially extending enlargement on the element and disposed to be engaged by said edge for closing said opening to stop the flow of fluid when said pressure difference reaches a predetermined amount.

2. Apparatus as set forth in claim 1, wherein the passage is cylindrical and the element extends longitudinally of the passage in coaxial relationship thereto.

3. Control apparatus for retaining a fluid at a selected pressure in fluid-receiving structure, said apparatus comprising:
   a housing adapted to be secured to the structure and having a fluid passage therethrough;
   a flexible sealing member of resilient material extending across the passage within the housing and normally blocking flow of fluid therethrough; and
   an elongated, cylindrical element in the passage and disposed to extend longitudinally of the housing, the member having a centrally disposed opening therethrough receiving said element, the inner edge of the member normally engaging the outer surface of the element in fluid-sealing relationship therewith, said member being stretchable under fluid pressure to shift said edge into a deflected location to permit flow of fluid through the passage when the difference in fluid pressure on the opposite sides of the member exceeds said selected pressure; and a pair of circumferentially extending enlargements on the element and disposed to be engaged by said edge for closing the opening to stop the flow of fluid when said pressure difference reaches a predetermined amount, each enlargement being disposed on opposite sides of the member for stopping the flow responsive to deflection of said member in either direction.

4. Apparatus as set forth in claim 1, wherein is included a rigid backing member in the housing and positioned to be engaged by the valve member when the member is in the extreme shifted position thereof to limit the extent of shifting of the member.

5. Control apparatus for retaining a fluid at a selected pressure in fluid-receiving structure, said apparatus comprising:
   a housing adapted to be secured to the structure and having a fluid passage therethrough;
   a rigid disc carried by the housing and extending across the passage, said disc having a hole therethrough;
   an elongated, cylindrical element in the passage and disposed to extend longitudinally of the housing and through said hole, the element having a peripherally extending enlargement thereon disposed in partial closing relationship with the hole; and
   a flexible sealing member of resilient material extending across the passage within the housing, normally blocking flow of fluid through the passage, and spaced longitudinally from the disc, said member having an opening therethrough receiving the element with the inner edge of the member defining said opening normally engaging the outer surface of the element, said edge being free to shift into a first deflected location to permit flow of fluid through the passage when the difference in fluid pressure on opposite sides of the member reaches said selected pressure, the edge of the member being free to shift to a second location when said pressure difference reaches a predetermined value, the disc and enlargement being disposed to be engaged by the member to close said hole and stop the flow when the edge is shifted to said second location by the fluid pressure of said predetermined value.

6. Control apparatus for retaining a fluid at a selected pressure in fluid-receiving structure, said apparatus comprising:
   a housing adapted to be secured to the structure and having a fluid passage therethrough;
   a pair of spaced discs of rigid material carried by the housing and extending across the passage, each disc having a centrally disposed hole therein;
   a flexible sealing member of resilient material extending across the passage within the housing and between the discs, said member normally blocking flow of fluid through said passage; and
   an elongated, cylindrical element in the passage and disposed to extend longitudinally of the housing, said member having an opening therethrough receiving the element, the element having a pair of axially spaced, annular enlargements thereon, there being an enlargement for each hole respectively with each enlargement disposed in partial closing relationship with a corresponding hole, the outer peripheral surface of the enlargement being spaced inwardly from the periphery of the hole, the inner edge of the member defining the opening normally engaging the outer surface of the element in fluid-sealing relationship therewith, said member being free to shift to a deflected location to permit flow of fluid through the passage when the difference in fluid pressure on opposite sides of the member reaches said selected pressure, the edge of the member being free to shift to a first deflected position when said pressure difference reaches a predetermined value in one direction and to a second deflected position when said pressure difference reaches a predetermined value in the opposite direction, the respective discs and enlargements being disposed to be engaged by said edge to close the corresponding hole and stop said fluid flow when the member is shifted into a deflected position by said pressure difference.

7. Control apparatus for retaining a fluid at a selected pressure in fluid-receiving structure, said apparatus comprising:
   a housing adapted to be secured to the structure and having a fluid passage therethrough;
   a rigid disc carried by the housing and extending across the passage, said disc having a hole therethrough;
   an elongated, cylindrical element in the passage and disposed to extend longitudinally of the housing and through said hole, the element having a peripherally extending enlargement thereon disposed in partial closing relationship with the hole; and
   a flexible sealing member of resilient material extending across the passage within the housing, normally blocking flow of fluid through the passage, and spaced longitudinally from the disc, said member having an opening therethrough receiving the element with the inner edge of the member defining said opening normally engaging the outer surface of the element, said edge being free to shift into a first deflected location to permit flow of fluid through the passage when the difference in fluid pressure on opposite sides of the member reaches said selected pressure, the edge of the member being free to shift to a second location when said pressure difference reaches a predetermined value, the disc and enlargement being disposed to be engaged by the member to close said hole and stop the flow therethrough when the edge is shifted to said second location by the fluid pressure of said predetermined value, said enlargement having a fluid bleed conduit therethrough disposed to permit passage of a small amount of fluid past the enlargement when the hole is closed by said member.

References Cited in the file of this patent

UNITED STATES PATENTS

| | | |
|---|---|---|
| 2,563,200 | Venning | Aug. 7, 1951 |
| 2,743,737 | Textor | May 1, 1956 |
| 2,941,544 | Peras | June 21, 1960 |